Figure 1:
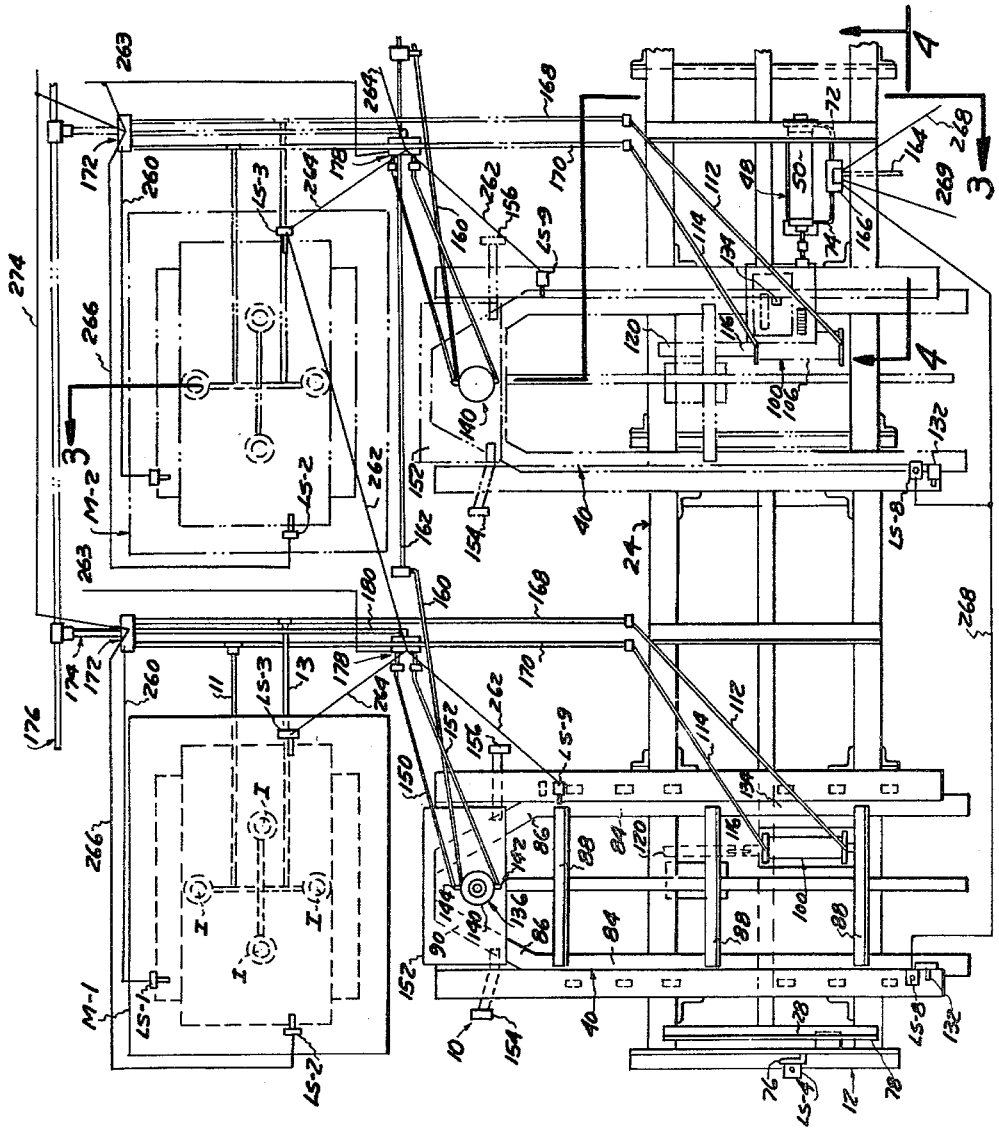

May 18, 1965 R. L. MEDLEY, JR 3,184,078
WORK HANDLING SYSTEM
Filed Jan. 2, 1963 4 Sheets-Sheet 1

FIG. I

INVENTOR.
ROBERT LEE MEDLEY JR.

BY *Barthel & Bugbee*
ATTORNEYS

INVENTOR
ROBERT LEE MEDLEY JR.

BY Barthel & Bugbee
ATTORNEYS

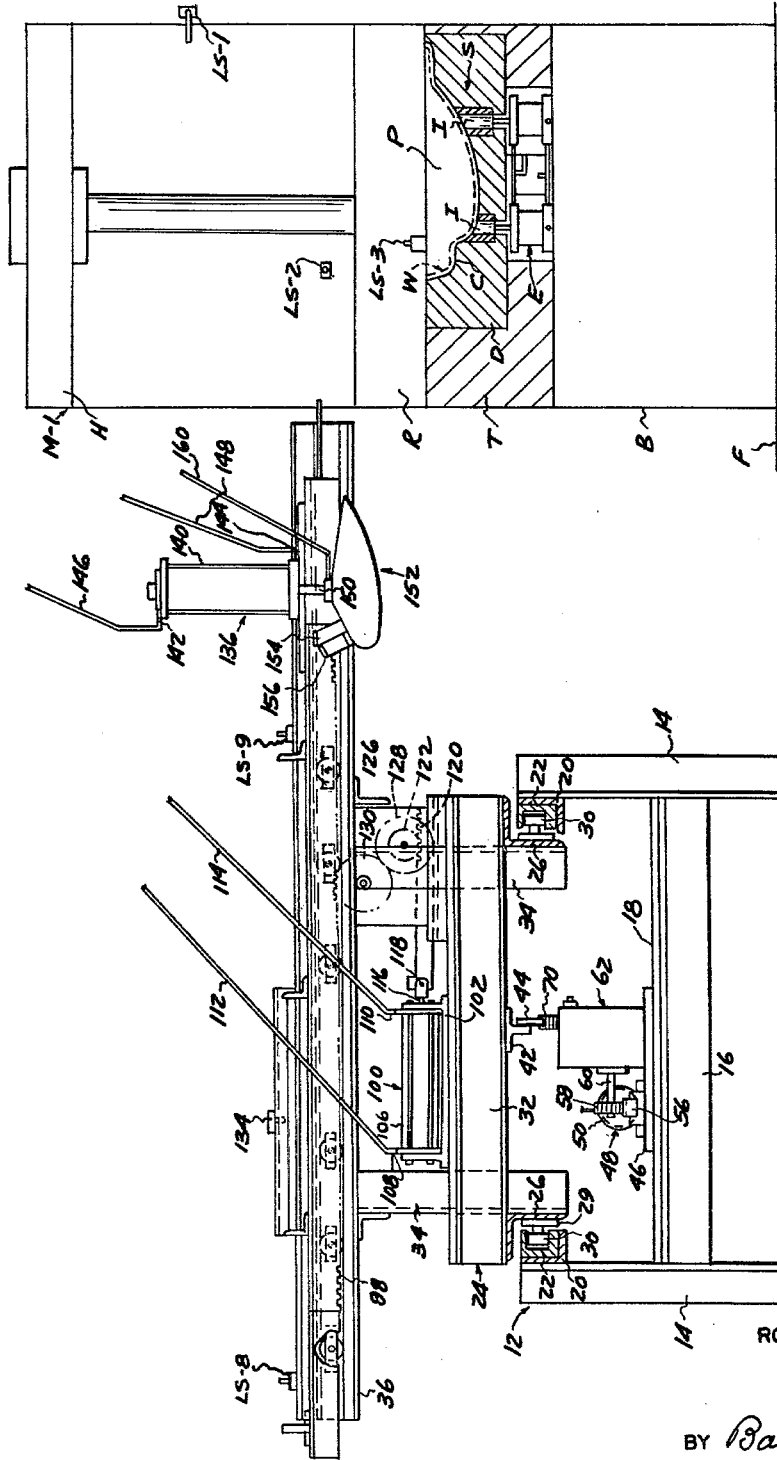

May 18, 1965

R. L. MEDLEY, JR 3,184,078

WORK HANDLING SYSTEM

Filed Jan. 2, 1963

4 Sheets-Sheet 4

INVENTOR
ROBERT LEE MEDLEY JR.

BY *Barthel & Bugbee*

ATTORNEYS

United States Patent Office 3,184,078
Patented May 18, 1965

1

3,184,078
WORK HANDLING SYSTEM
Robert Lee Medley, Jr., 18451 St. Mary's St.,
Detroit, Mich.
Filed Jan. 2, 1963, Ser. No. 249,034
12 Claims. (Cl. 214—1)

This invention relates to work-handling equipment and, in particular, to work transfer apparatus for unloading, transferring and loading workpieces from one machine to another for successive operations performed by the machines upon each workpiece.

Hitherto, workpieces such as stampings from stamping presses have been loaded, unloaded and transferred manually between the successive machines, with the consequent risk of injury to the operator in the event of carelessness or inattentiveness on his part or malfunctioning of the machine. This problem is especially serious where workpieces such as stampings are produced by die sets from sheet material, such as sheet metal, even though the sheet metal blanks for the initial pressing operation have been inserted automatically in the first machine of a group of machines, producing successive operations upon the workpieces, due to the necessity on the part of the operator of reaching into the machine to remove the workpiece after each die set has completed its work, and of transferring it to the next machine. This danger of injury is only partly reduced where the die set is provided with an ejector for expelling the workpiece from the die cavity.

The present invention provides a work transfer apparatus which withdraws the ejected workpiece from the die cavity of the die set of each machine and also transfers it bodily from machine to machine and then inserts it accurately in the die cavity of the die set of the next successive machine. At the same time, the apparatus lifts the workpiece to cause it to clear the die cavity of the die set and also to transfer it from the last machine in the group to a conveyor or other place of disposal, also, where necessary, partially or completely inverting the workpiece before it is deposited upon the place of disposal, such as the conveyor.

Accordingly, one object of the present invention is to provide a work transfer apparatus which grips a workpiece, such as by a magnetic chuck, upon the completion of the machining operation of one machine, transfers it across the space between successive machines of a group of machines performing operations upon the workpiece, reinserts it accurately in each successive machine and, after processing by that machine, removes it from that machine without requiring any manual handling of the workpiece.

Another object is to provide a work transfer apparatus of the foregoing character wherein the workpiece, upon its removal from the final machine in the group of machines engaged in its processing, is then picked up and transferred automatically to a place of disposal, such as a conveyor, hopper, or supporting buck, ready for further handling or processing by another group of machines.

Another object is to provide a work transfer apparatus as set forth in the object immediately preceding, wherein the workpieces are handled by individually movable cross carriages mounted upon a common longitudinal or main carriage, thereby enabling the work handling to be exactly conformed to the possibly differing constructional or operating characteristics of each work-processing machine.

Another object is to provide a work transfer apparatus as set forth in the preceding objects wherein the workpiece is finally handled by a lifter assembly which picks it up from a work dispatch location, swings it around through any desired angle, and then deposits it on the place of disposal, such as a conveyor, thereby enabling another

2 workpiece to be placed on the work dispatch location in the meantime.

Figure 2:
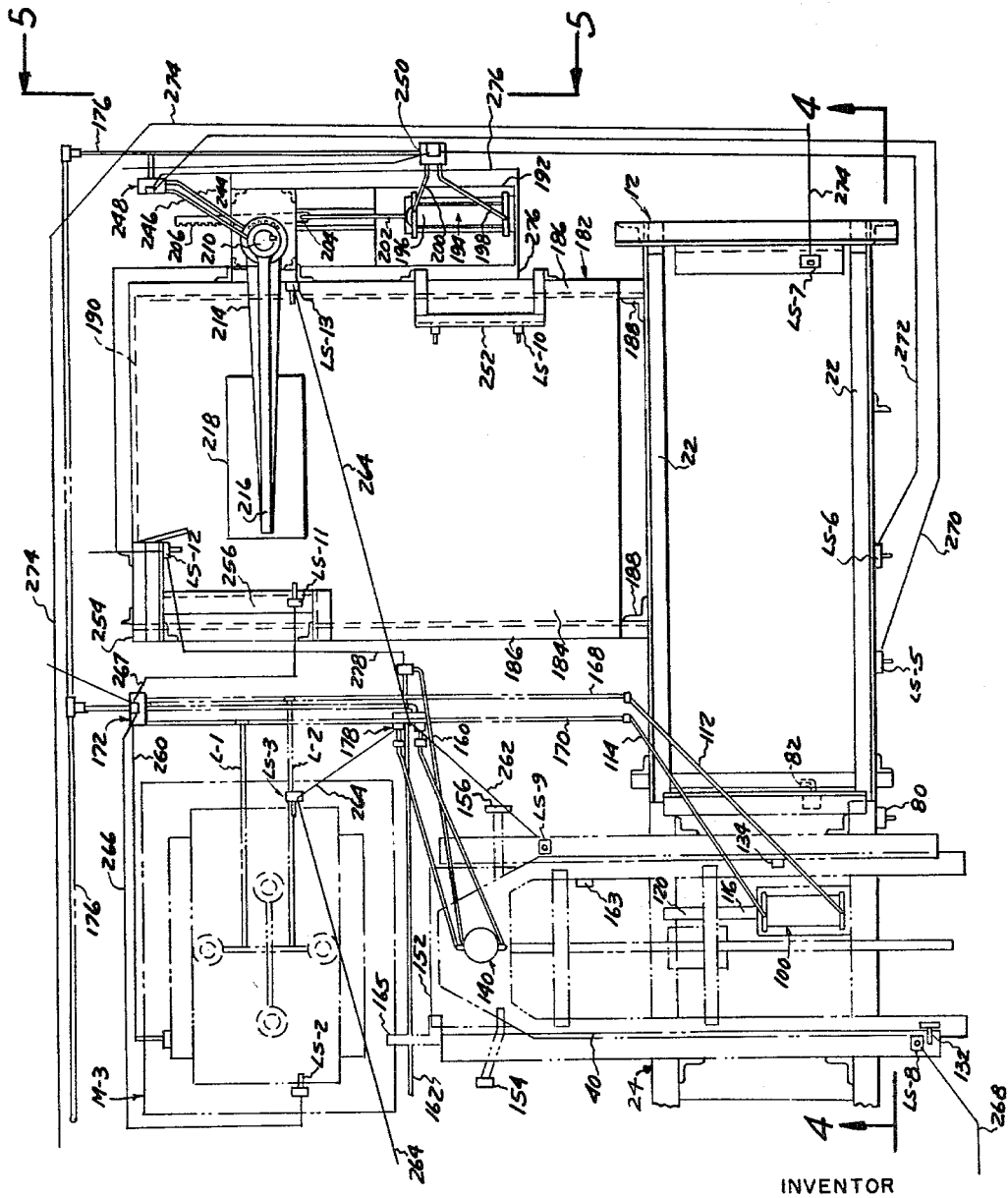
Figure 5:
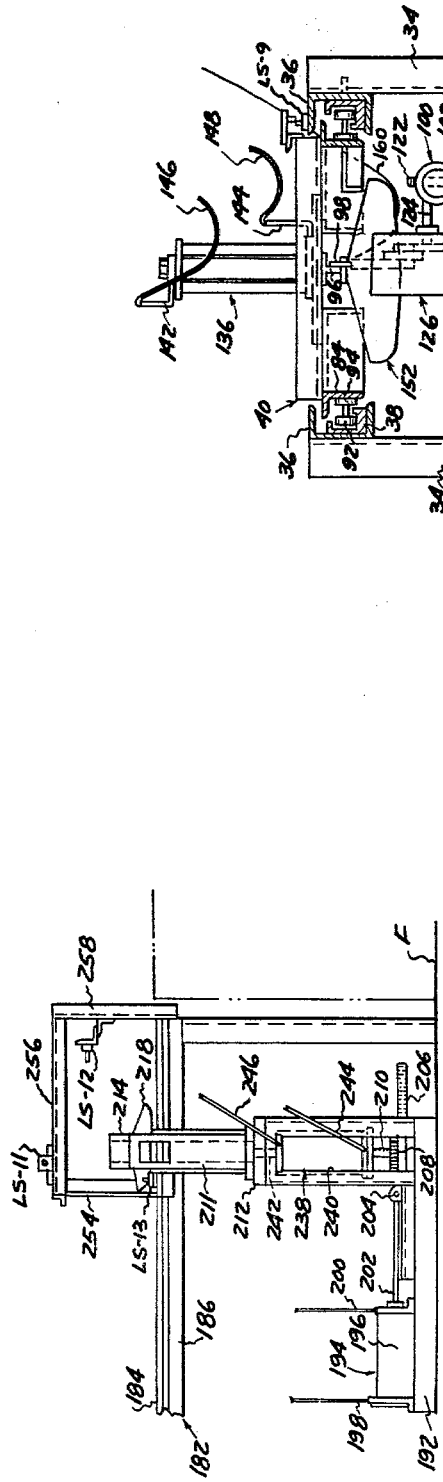
Figure 4:
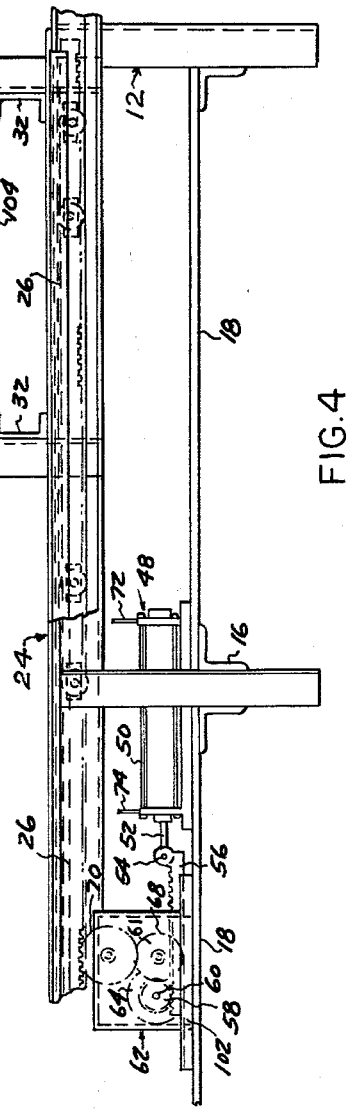

Other objects and advantages of the invention will become apparent during the course of the following description of the accompanying drawings, wherein:

FIGURES 1 and 2 are top plan views respectively of the left-hand and right-hand portions of the work transfer apparatus, according to one form of the present invention, as arranged for handling the workpieces automatically between three processing machines, such as presses, and finally transferring it to a place of disposal which is final for the particular group of machines, the parts being shown in their starting positions with the apparatus at rest;

FIGURE 3 is a central vertical cross section, taken along the line 3—3 in FIGURE 1, through one of the individually movable work transfer units, with the work processing machine shown diagrammatically as a sheet metal forming press;

FIGURE 4 is a fragmentary front elevation, partly in central vertical longitudinal section, taken along the lines 4—4 at the right-hand end of FIGURE 1 and at the left-hand end of FIGURE 2, showing the interconnection between FIGURES 1 and 2; and FIGURE 5 is a right-hand end elevation of the upper right-hand corner of FIGURE 2, looking in the direction of the lines 5—5 therein.

Referring to the drawings in detail, FIGURES 1 and 2 show in top plan view a work transfer apparatus, generally designated 10, according to one form of the invention as serving a group of conventional work-processing machines such as presses, M–1, M–2 and M–3 (FIGURE 3), which are mounted on the floor or foundation F, preferably of concrete. Each of the presses is provided with a head H, a bed B interconnected by strain rods (not shown), and a vertically reciprocable platen or ram R. Each machine M is also provided with a die set S consisting of a punch P secured to the vertically movable press platen or ram R and a die D secured to the press bed B and having a die cavity C into which the punch P enters and with which it mates. Each die D is equipped with a work ejector E consisting of pressure fluid ejector cylinders E having ejector pins or bars I reciprocated by the ejector cylinders E to eject the processed workpiece W at least partially from the die cavity C. Each machine M is equipped with limit switches LS–1, LS–2 and LS–3 respectively, the operation of which will be subsequently described. The ejector cylinders E are served by pressure fluid service lines 11 and 13 which are supplied alternately with pressure fluid while the other line is exhausted or discharged in a manner described more fully below.

The work transfer apparatus 10 includes an elongated main base frame structure 12 having vertical posts 14 interconnected by intermediate cross members 16 (FIGURE 3) conveniently of angle cross-section, such as steel angle bars, and likewise interconnected by intermediate longitudinal frame members or plates 18, the term "intermediate" being employed because their positions are intermediate the upper and lower ends of the posts 14. Mounted on the inner sides of the upper ends of the posts 14 are angle members 20 (FIGURE 3) which in turn support inwardly-facing channel rails 22 disposed in spaced parallel relationship. Longitudinally reciprocably mounted on the base structure 12 to move back and forth along the channel rails 22 is a main carriage or base carriage, generally designated 24, in the form of an open-centered rectangular frame consisting of longitudinal members 26 preferably of angle cross-section (FIGURES 3 and 4) joined at their opposite ends by end cross members 28 and carrying bearing blocks 29 upon which rollers 30 are rotatably mounted upon horizontal axes to roll freely in the channel rails 22.

Secured to and extending across the upper flanges of the angle members 26 of the main carriage 24 are three cross-carriage supporting structures, generally designated 32, including three pairs of laterally-spaced intermediate cross channel members 33, each pair provided with four upstanding angle posts 34 (FIGURES 3 and 4). Secured to the upper ends of the angle posts 34 are three inwardly-facing pairs of horizontal channel members 36 disposed perpendicular to the longitudinal angle members 26 and parallel to the cross channel members 32. Mounted within each pair of the channel members 36 and extending in the same directions are angle guide rails 38 upon which a cross carriage, generally designated 40, is reciprocably mounted. The three cross-carriages 40, being thus independently mounted are individually movable relatively to one another and are therefore adaptable to any varying constructional or operational characteristics of the machines M-1, M-2 or M-3. Mounted on the undersides of the cross channels 32 and midway between the angle posts 34 is a T-rail 42 (FIGURE 3) which in turn supports an elongated toothed rack bar 44 bolted or otherwise secured thereto.

Mounted on the intermediate longitudinal frame members or plates 18 (FIGURE 3) is the base plate 46 of a reciprocable pressure fluid motor 48 having a cylinder 50 and a reciprocable piston 52 (FIGURE 4). Pivotally coupled at 54 to the piston 52 is a toothed motive rack bar 56 meshing with a pinion 58 mounted on the rotary input shaft 60 of a gear box, generally designated 62. The gear box 62 contains intermeshing gearing 64, 66 and 68 which drives an output pinion 70 and the latter meshes with and drives the rack bar 44. Accordingly, as pressure fluid is supplied to one of the pressure fluid service pipes 72 and 74 of the reciprocable fluid pressure motor 48, the piston 52 and rack bar 56 reciprocate to rotate the output pinion 70 in opposite directions and consequently to move the rack bar 44 and main carriage 24 in opposite directions along the channel rails 22, as described below in connection with the operation of the invention. The timing and travel of the main carriage 24 and its cooperating workpiece discharge mechanisms described subsequently below are controlled by limit switches LS-4, LS-5, LS-6 and LS-7 actuated by actuator members 76, 78, 80 and 82 respectively as explained more fully below.

Each of the three cross carriages 40 consists of parallel side angle members 84 (FIGURES 1 and 4) with converging inner end portions 86 at one end and joined by cross members 88 and by a shelf 90 at the inner end. Rollers 92 rotatably mounted on bearing blocks 94 on the side members 8A support each cross carriage 40. Running down the center line of each cross carriage 40 and secured to and depending from the undersides of the cross members 88 is a T-rail 96 (FIGURE 4) carrying a toothed rack bar 98. The rack bar 98 is reciprocated by a reciprocatory fluid pressure motor 100, one for each cross carriage 40 and mounted on a supporting plate or base plate 102 (FIGURE 3) which in turn is mounted on a plate 104 extending between and supported on top of the cross channel members 32 (FIGURE 4). The motor 100 includes a cylinder 106 having fluid service pipes 108 and 110 at its opposite ends, these in turn being connected to flexible hoses 112 and 114 respectively (FIGURE 3). The motor 100 also includes a reciprocatory piston 116 which is coupled pivotally at 118 to a toothed rack bar 120. The rack bar 120 in turn meshes with an input pinion 122 mounted on the input shaft 124 of a gear box, generally designated 126, similar to the gear box 62 and similarly containing intermeshing gearing 128 culminating in an output gear or pinion 130 which meshes with the rack bar 98. Reciprocation of each cross carriage 40 is controlled between predetermined limits by outer and inner limit switches LS-8 and LS-9 (FIGURE 1) operated by actuators 132 and 134 respectively.

Mounted on the shelf 90 at the inner end of each of the three cross carriages 40 is a vertical reciprocable fluid pressure motor, generally designated 136 (FIGURES 1, 2, 3 and 4). Each motor 136 constitutes the motive unit of a vertical workpiece mover, generally designated 138 (FIGURE 3). The motor 136 includes a cylinder 140 having upper and lower fluid service pipes 142 and 144 respectively connected to flexible hoses 146 and 148. Reciprocably mounted in each cylinder 140 and extending downwardly therefrom is a piston 150 on the lower end of which is mounted a conventional magnetic chuck 152. Mounted on each magnetic chuck 152 are two laterally-extending limit switch actuators 154 and 156 respectively (FIGURES 1 and 3) which in the inner position of each cross carriage 40 actuate the limit switches LS-2 and LS-3 respectively, as explained below in connection with the operation of the invention. The magnetic chuck 152 is configured to fit into the die cavity C and remove the workpiece W, assumed to be of ferrous metal or other magnetically-attracted material. The magnetic chuck 152 is supplied with electric current for energizing the electromagnetic element or elements thereof by a flexible conductor cable 160 which in turn is connected to the two remaining flexible cables 160 by a main conductor cable 162 (FIGURES 1 and 2). The main conductor cable 162 is in turn connected to a suitable source of current electricity.

For actuating work-delivery mechanism described subsequently herein, the third cross carriage 40 (adjacent the work-processing machine M-3 in FIGURE 2) is provided with an additional switch actuator 163, and its magnetic chuck 152 is provided with an additional forwardly-projecting switch actuator 165.

Pressure fluid is supplied to the pressure fluid service pipes 72 and 74 of the reciprocable fluid pressure motor 48 by a supply conduit 164 (FIGURE 1) through a conventional solenoidal reversing valve 166, the opposite service ports of which are connected to the service pipes. Similarly, the service hoses 112 and 114 of the fluid pressure motors 100 are connected to pressure fluid conduits 168 and 170 respectively which in turn run to the service ports of a solenoidal valve 172 supplied with pressure fluid through a pressure fluid supply conduit 174. Each of the supply conduits 174 is connected to a main pressure fluid supply conduit 176 (FIGURE 1) which in turn is connected to a suitable source of pressure fluid. Finally, the flexible hoses 146 and 148 for the vertical fluid pressure motors 136 are connected to the service ports of conventional solenoidal pressure fluid reversing valves 178 which in turn are supplied with pressure fluid through pressure fluid supply conduits 180 also leading to the main pressure fluid supply conduit 176.

Connected to and extending perpendicularly inward from the right-hand end portion of the main base frame structure 12 is an auxiliary base frame structure, generally designated 182 (FIGURES 2 and 5) including a rectangular workpiece dispatch platform 184 mounted on and extending between parallel longitudinal members 186 which in turn are secured to the upper ends of corner posts 188. The outer ends of the longitudinal members 186 are secured to one of the channel rails 22 while their inner ends are interconnected by a cross member 190.

Mounted on the floor or foundation F is an auxiliary base plate 192 which supports a horizontal reciprocatory fluid pressure motor, generally designated 194. The latter includes a cylinder 196 supplied with pressure fluid through service pipes 198 and 200 and contains a reciprocatory piston 202. The piston 202 is pivotally coupled at 204 to a rack bar 206, the teeth of which face sidewise so as to mesh with a gear 208 mounted on a lower rotary vertical shaft 210. The lower vertical shaft 210 is journaled in a pedestal structure 212 (FIGURE 5) resting on the base plate 192 in the upper portion of which is journaled an upper rotary vertical shaft 211 to the upper end of which is keyed or otherwise drivingly secured a swinging arm 214. Secured to the shaft 216 forming the outer portion of the arm 214 is a conventional magnetic chuck 218 similar to the magnetic chuck 152 and similarly configured to fit the workpiece W.

Mounted on and drivingly connected to the upper end of the lower vertical shaft 210 is the cylinder 240 of a vertical fluid pressure motor 238. The cylinder 240 contains a reciprocable piston 242 non-rotatably keyed thereto. The piston 242 in turn is coupled to the upper vertical shaft 211 and keyed or otherwise connected thereto to prevent relative rotation therebetween to raise and lower the shaft 211 and with it the arm 214, the shaft 216 and the magnetic chuck 218 connected thereto. The cylinder 240 is provided at its opposite ends with fluid service pipes 244 and 246 respectively connected to a solenoidal valve 248 which is supplied with pressure fluid from the main pressure fluid supply conduit 176.

Also connected to the main pressure fluid supply conduit 176 is a solenoidal valve 250 to which the service pipes 198 and 200 of the fluid pressure motor 194 are connected. Mounted on the workpiece dispatch platform 184 adjacent and above the left-hand side thereof is a limit switch supporting frame 252 (FIGURE 2) carrying a double-acting or double-throw limit switch LS–10. Mounted on the inner left-hand corner of the workpiece dispatch platform 184 is an L-shaped upstanding limit switch supporting frame 254 (FIGURES 2 and 5). Mounted on top of one arm 256 of the frame 254 is a limit switch LS–11, whereas mounted on the rearmost vertical post 258 thereof (FIGURE 5) is a single-acting limit switch LS–12.

The electrical wiring and electrical circuit interconnecting the various limit switches and solenoidal valves is most conveniently described in connection with the operation of the invention.

*Operation*

At the start of the operating cycle of the work transfer apparatus 10, let it be assumed that the parts are in their starting or rest positions shown in the drawings and that a sheet metal blank of magnetically-attracted material such as sheet steel has been fed either manually or by a conventional automatic feed into the die set D, and formed into a workpiece W by the punch P on the ram R of the press or machine M–1, which has descended to its closed or lowered pressing position shown in FIGURE 3. As the operating cycle commences, the hydraulic pressure fluid flow to the presses M–1, M–2 and M–3 has been reversed or, if these are mechanical presses, the mechanism reversed so that the ram R is about to start upward upon its retraction or return stroke. As each ram R nears the upper end of its retraction stroke, it engages and actuates the limit switch LS–1 which energizes its respective solenoidal valve 172 by closing the circuit in the conductor cable 260 leading thereto, which in turn moves into its forward position to supply pressure fluid to the conduit 168 and flexible hose 112 leading to each fluid pressure motor 100, at the same time supplying pressure fluid to the branch line 13. This action operates the ejector cylinders E to cause the ejector pins I to move upward (FIGURE 3) and break the contact between the workpiece W and the die cavity C of the die D.

At the same time, the supplying of pressure fluid to the flexible hose 112 and service pipe 108 (FIGURE 3) at the rearward end of the cylinder 106 of each fluid pressure motor 100 and the consequent exhausting of fluid from the pipe 110 and hose 114 at its forward end cause the piston 116 thereof to move forward, pushing forward the rack bar 120 and rotating the pinion 122 of the gear box 126 in a counterclockwise direction. This motion, transmitted through the gearing 128, 130 within the gear box 126, moves each cross carriage 40 forward through the driving action of the rack bar 98 upon each cross carriage 40.

Each cross carriage 40 continues to move forward in this manner toward its respective press or other machine M–1, M–2 or M–3, until the limit switch actuator 134 upon each cross carriage 40 engages and closes its respective limit switch LS–9. The closing of limit switch LS–9 energizes the conductor cable 262 to energize and shift its respective solenoidal valve 178 to its forward position to supply pressure fluid to the forward fluid supply or service hoses 152. This action energizes the conductor cable 160, 162 leading to each magnetic chuck 152 and supplies pressure fluid to the service pipe 142 at the upper end of each cylinder 140 of each vertical fluid pressure motor 136, at the same time exhausting pressure fluid from the service pipe 144 and hose 148 at the lower end of the cylinder 140 (FIGURE 3), thereby causing the piston 150 to move downward, moving the now energized magnetic chuck 152 downward into sufficiently close proximity to the now partly-ejected workpiece W to magnetically grip and withdraw it fully from the die cavity C.

At the end of the downward or forward stroke of the magnetic chuck 152, its actuator 156 engages and closes the limit switch LS–3 (FIGURE 3) which energizes the solenoidal valve 178 through the conductor cable 264, thereby shifting the solenoidal valve 178 into its rearward or reverse position so as to supply pressure fluid to each reverse service hose 150, at the same time exhausting fluid from each forward service hose 152. This action moves the piston 150 and magnetic chuck 152 upward with its magnetically-gripped workpiece W until the switch actuator 154 carried by the magnetic chuck 152 actuates the limit switch LS–2 and thus energizes the conductor cable 266. This action reverses the solenoid valve 172 which in turn then supplies pressure fluid to the reverse service conduit 170 and hose 114 to the forward end of the cylinder 106 of each fluid pressure motor 100, at the same time exhausting fluid through the hose 112 and conduit 168. This action causes the piston 118 and rack bar 120 to move rearwardly upon their retraction strokes (FIGURE 3), transmitting this motion through the gearing 122, 128, 130 of the gear box 126 to the rack bar 98, thereby causing each cross carriage 40 to move rearwardly toward its retracted position shown in FIGURES 1 and 3.

When each cross carriage 40 reaches its fully retracted position, its limit switch actuator 132 closes each limit switch LS–8 (FIGURE 1), thereby energizing the solenoidal switch 166 through the conductor cable 268 and shifting it to its forward position. This action supplies pressure fluid through the service pipe 72 to the right-hand or forward end of the cylinder 50 of the reciprocatory fluid pressure motor 48, at the same time exhausting fluid from its rearward or left-hand end through the service pipe 74 (FIGURES 1 and 4), whereupon the piston 52 and rack bar 56 move to the left, transmitting this motion through the gearing 60 to 70 in the gear box 62 to move the main carriage 24 to the right or forward direction along the main base frame structure 12, carrying the now retracted cross carriages 40 and their supporting structures 32 bodily to the right in a direction parallel to the presses or other machines M–1, M–2, M–3 (FIGURES 1 and 2).

The main carriage 24 continues to move forward to the right until its limit switch actuator 80 engages and shifts limit switch LS–5. The closing of the latter energizes the solenoidal valve 248 by energizing the conductor cable 270 leading thereto (FIGURE 2), shifting the solenoidal valve 248 to its forward position supplying pressure fluid to the forward service conduit 244 at the bottom of the cylinder 240 of the motor 238 and exhausting fluid from the service conduit 246 and upper end of the cylinder 240, causing the piston 242 thereof to move upward, carrying with it the upper shaft 211 and arm 214 with the magnetic chuck 218 rotatably mounted on the shaft 216.

The main or base carriage 24 continues to move forward to the right until its limit switch actuator 80 closes the limit switch LS–6 which in turn energizes the solenoidal valve 250 through the energization of the conductor cable 272 leading thereto. This action shifts the solenoidal valve 250 to its forward position so as to supply pressure fluid to the forward service conduit 200 leading to the forward end of the cylinder 196 of the fluid pressure motor 194 (FIGURE 2), at the same time exhausting fluid from the service pipe 198. This action causes the piston 202 and rack bar 206 to move forwardly relatively to the cylinder 196, thereby rotating the gear or pinion 208 and consequently rotating the vertical shafts 210 and 211, cylinder 240 and piston 242 bodily as a unit in a clockwise direction, swinging the arm 214, shaft 216 and magnetic chuck 218 in a clockwise direction through any desired angle, such as approximately 90 degrees, thereby moving the magnetic chuck 218 completely off the workpiece dispatch platform 184 and over a place of discharge of the workpiece, such as a conveyor (not shown).

The main or base carriage 24 still continues to move forward to the right until the switch actuator 82 carried by its right-hand or forward end (FIGURE 2) engages and closes the limit switch LS–7, thereby energizing the conductor cable 274 leading to the solenoidal valve 172 and energizing the latter to shift them in forward directions. This action again supplies pressure fluid to the conduits 168 and hoses 112 leading to the cylinders 106 of the fluid pressure motors 100, at the same time exhausting pressure fluid from the hoses 114 and conduits 170 leading to the opposite ends thereof. This action again causes the fluid pressure motor pistons 116 and rack bars 120 to move forward, again causing the cross carriages 40 to move inward toward the presses or other machines with which they are now aligned by the forward travel of the main carriage 24 to the right.

At this time, the first or left-hand cross carriage 40 is now aligned with the second machine M–2, the second or middle cross carriage 40 is now aligned with the third machine M–3 and the third or right-hand cross carriage 40 is now aligned with the center line of the workpiece dispatch platform 117. The first or left-hand and middle cross carriages 40 move forward in response to the above-described action of their respective reciprocatory motors 100, to positions over the respective die cavities C, the press rams R being again retracted upward (FIGURE 3), and their respective magnetic chucks 152 are again moved downward by respective vertical fluid pressure motors 136 to deposit their respective workpieces W in the now aligned die cavities C. The forward motion of the third or right-hand cross carriage 40 (FIGURE 2) which is now aligned with the workpiece dispatch platform 184 causes its limit switch actuator 163 to engage and actuate the limit switch LS–10 which in turn energizes the conductor cable 276 leading to the solenoidal valve 248, energizing and shifting the latter to its reverse position. This action supplies pressure fluid to the upper service conduit 246 of the cylinder 240 of the vertical fluid pressure motor 238 (FIGURES 2 and 5) and exhausts fluid from the service conduit 244 leading from the lower end thereof, thereby causing the piston 242, shaft 211, arm 214, shaft 216 and magnetic chuck 218 to descend.

Meanwhile, during the lowering of the magnetic chuck 218 toward the workpiece dispatch platform 184, the switch actuator 134 in each cross carriage 40 actuates its respective limit switch LS–9, thereby energizing its respective solenoidal valve 178 by the consequent energization of the respective conductor cable 262, shifting the solenoidal valve 178 to its forward position. This action supplies pressure fluid to the forward service conduits or hoses 152 and exhausts fluid from the hoses 150 of the vertical fluid pressure motors 136, again moving their respective magnetic chucks 152 downward with the workpieces W adhering to them, moving the latter into their respective die cavities C, referring to the first and second cross carriages 40 which at this instant are in line with the second and third presses or other machines M–2 and M–3.

In the meantime, the forward motion of the third or right-hand cross-carriage 40 over the workpiece dispatch platform 184 has reached its forward limit, and the descent of its magnetic chuck 152 as described above lowers its forward limit switch actuator 165 (FIGURE 2) into engagement with limit switch LS–12 on the switch supporting frame 254. This action opens the electrical circuit in the conductor cable 160 leading to the magnetic chucks 152 from the conductor cable 162, de-energizing the magnetic chucks 152 and consequently releasing their grip upon their respective workpieces which drop either into the die cavities C of the second and third presses M–2 and M–3 or onto the workpiece dispatch platform 184, as the case may be.

At the same time, the switch actuators 156 also carried by the magnetic chucks 152 actuate the limit switches LS–3, again energizing the solenoidal valves 178 through the consequent closing of the circuit in the conductor cables 264, shifting the solenoidal valves 178 to their reverse positions so as to supply pressure fluid to the flexible hoses 148 leading to the lower ends of the vertical motors 136 while exhausting fluid from the hoses 146 connected to the upper ends thereof, and causing the pistons 150 and magnetic chucks 152 to move upward.

As the magnetic chuck 152 of the third cross carriage 40 rises in this manner, its additional switch actuator 165 again actuates the limit switch LS–12 on switch supporting frame 254, re-energizing the conductor cables 162 and 160 by way of the conductor cable 278 (FIGURE 2), re-energizing the magnetic chucks 152. At the upper ends of the strokes of the pistons 150 of the vertical fluid pressure motors 136, the limit switch actuators 154 actuate the limit switches LS–2 which in turn re-energize the conductor cables 266, reversing the solenoidal valves 172. This action supplies pressure fluid to the reverse service conduit 170 and hoses 114 and at the same time exhausts fluid through the forward hoses 112 and conduits 168, moving the pistons 116 rearwardly into their respective cylinders 106. This action, in the manner described above, moves the first and second cross carriages 40 rearwardly away from the presses M–1 and M–2 and the third cross carriage 40 rearwardly over the workpiece dispatch platform 184 by means of the drive transmitted through the gear boxes 126 and rack bars 98 (FIGURE 3).

As the third or right-hand cross carriage 40 moves rearwardly over the workpiece dispatch platform 184, the additional limit switch actuator 54 thereon actuates the limit switch LS–10 on the switch supporting frame 252 (FIGURE 2), thereby closing the circuit in the conductor cable 276 so as to again energize the solenoidal valve 248. The solenoidal valve 248 is thus shifted to its forward position so as to supply pressure fluid to the forward service line 244 of the vertical fluid pressure motor 238, at the same time exhausting the upper service conduit 246 and thus causing the piston 242, shaft 211, arm 214, shaft 216 and magnetic chuck 218 to rise.

As the three cross carriages 40 reach the ends of their retraction or rearward strokes, each switch actuator 132 actuates its respective limit switch LS–8, consequently energizing the conductor cables 268, again energizing and actuating the solenoidal valve 166 but in a reverse direction, so as to supply pressure fluid to the rearward service conduit 74 and exhaust fluid from the forward service conduit 96 thereof, causing the piston 52 and rack bar 56 to move toward the cylinder 50. This action is transmitted through the gear box 62 to the output pinion or gear 70 thereof, rotating the latter in a counterclockwise direction and causing the main carriage 24 to commence moving to the left upon its return stroke (FIGURES 1 and 4).

As the main carriage 24 moves backward to the left over the base frame 12, the switch actuator 80 first engages and actuates limit switch LS–6 so as to energize the conductor cable 272 and solenoidal valve 250 in a forward direction. This action supplies pressure fluid to the forward service pipe or conduit 198 and exhausts fluid from the rearward service line 200, causing the piston 202 and rack bar 206 to move forward away from the cylinder 196 of the reciprocatory motor 194 (FIGURE 2), consequently rotating the pinion 208 in a counterclockwise direction. This action causes the lower and upper shafts 210 and 211, and the cylinder 240 and piston rod 242 to rotate bodily in a counterclockwise direction, thereby swinging the arm 214 and the magnetic chuck 218 carried by its shaft 216 backward in a counterclockwise direction so as to position the magnetic chuck 218 directly over the workpiece dispatch platform 184 above the workpiece W previously deposited thereon by the magnetic chuck 152 of the third or left-hand cross carriage 40, which has just been retracted as explained above.

While this is occurring, the leftward or rearward travel of the main carriage 24 relatively to the main base frame 12 causes its limit switch actuator 80 to actuate the limit switch LS-5 which again actuates the solenoidal valve 248 in a reverse direction to supply pressure fluid to the upper service conduit 246 of the cylinder 240 of the fluid pressure motor 238 while exhausting fluid from its lower service conduit 244. This action causes the piston 242 to move downward (FIGURE 5), carrying with it the upper shaft 211, arm 214, and magnetic chuck 218 bringing the latter moves into sufficiently close proximity to the workpiece W to pick it up and transfer it to the conveyor or other place of workpiece disposal during the next cycle of operation. Finally, as the main carriage 24 reaches the end of its return or leftward stroke, the switch actuator 76 engages and actuates the limit switch LS-4 to halt and reverse the travel of the main carriage 25, ready for the start of a new cycle of operation, as described above.

While the invention has been described and illustrated in connection with three cross carriages 40 serving three machines M-1, M-2 and M-3, it will be evident that a greater number thereof may be employed, depending upon the number of machines necessary for the processing of the workpieces W during this stage of manufacture.

It will be understood that the various limit switches and solenoidal valves are also energized by power lines or "hot" lines running to them from a source of current electricity. For example, the three solenoidal valves 178 are energized by the power line 263, and the third solenoidal valve 172 is provided with a conductor cable 267 running to the limit switch LS-11. The solenoidal valve 166 is energized by the power line 269 and a conductor cable 264 runs from the third solenoidal valve 178 to the limit switch LS-13 which controls the motion of the arm 214.

What I claim is:

1. A work transfer apparatus for moving workpieces between a plurality of workpiece processing stations disposed side by side in substantial alignment with one another, said apparatus comprising an elongated base frame structure having a longitudinal guideway thereon adapted to be positioned substantially parallel to the stations, a longitudinal carriage mounted for travel in a longitudinal direction along said longitudinal guideway, a plurality of cross-carriage supporting structures mounted in longitudinally spaced relationship on said main carriage and having a plurality of transverse guideways thereon disposed transversely to said longitudinal guideway in spaced substantially parallel relationship, a plurality of cross-carriages mounted on said transverse guideways for travel back and forth therealong toward and away from their respective stations, a workpiece carrier mounted on each cross-carriage, a workpiece gripper mounted on each workpiece carrier, a workpiece receiver disposed adjacent said base frame structure in approximate alignment with said stations, means for advancing and retracting said cross-carriages to and from said stations in timed relationship with one another, means responsive to the retraction of said cross-carriages to predetermined locations for moving said longitudinal carriage step by step to and fro along said longitudinal guideway in steps corresponding approximately to the spacing of said stations, and means responsive to the initial arrival of said grippers at said stations for activating said grippers to grip workpieces disposed at said stations and responsive to the subsequent arrival of said grippers at the next adjacent stations for inactivating said grippers to release the gripped workpieces.

2. A work transfer apparatus according to claim 1, wherein there is also provided a workpiece remover at said workpiece receiving station operable in timed relationship with said cross-carriages.

3. A work transfer apparatus according to claim 2, wherein said workpiece remover includes a swinging workpiece carrier element carrying a workpiece removal gripper.

4. A work transfer apparatus according to claim 3, wherein said workpiece remover includes means for raising and lowering said workpiece removal gripper relatively to said receiving station.

5. A work transfer apparatus according to claim 4 wherein means is provided for raising and lowering said workpiece removal gripper and for swinging said swinging element in timed relationship with the travel of said crosscarriages.

6. A work transfer apparatus according to claim 3, wherein means is provided for swinging said workpiece carrier element in an arcuate approximately horizontal path toward and away from said workpiece receiver.

7. A work transfer apparatus according to claim 1, wherein said workpiece grippers comprise magnetic chucks.

8. A work transfer apparatus according to claim 7, wherein each workpiece carrier comprises an elevator movable vertically relatively to its respective cross-carriage.

9. A work transfer apparatus according to claim 8, wherein each elevator includes a reciprocable fluid pressure motor having a piston depending therefrom and wherein said work gripper is connected to its respective piston.

10. A work transfer apparatus according to claim 8, wherein means is provided for lowering said elevator in response to the arrival thereof above its respective station.

11. A work transfer apparatus according to claim 10, wherein means is provided for raising said elevator in response to its arrival at a predetermined level below its respective cross-carriage.

12. A work transfer apparatus according to claim 11, wherein said advancing and retracting means includes timing means responsive to the rising of said elevator to a predetermined level for initiating retraction of its respective cross-carriage.

References Cited by the Examiner
UNITED STATES PATENTS

| | | |
|---|---|---|
| 3,075,651 | 1/63 | Kaden. |
| 3,090,498 | 5/63 | Palmer. |
| 3,091,347 | 5/63 | Sehn. |
| 3,107,402 | 10/63 | Hunter. |

HUGO O. SCHULZ, *Primary Examiner.*